United States Patent
Tietze et al.

(10) Patent No.: US 9,732,682 B2
(45) Date of Patent: Aug. 15, 2017

(54) INTERNAL COMBUSTION ENGINE WHICH MAY BE SELECTIVELY OPERATED BY THE TWO-STROKE METHOD OR THE FOUR-STROKE METHOD AND METHOD FOR OPERATING SUCH AN INTERNAL COMBUSTION ENGINE

(71) Applicant: Ford Global Technologies, LLC, Dearborn, MI (US)

(72) Inventors: Torsten Tietze, Berlin (DE); Christian Winge Vigild, Aldenhoven (DE); Andreas Kuske, Geulle (NL); Wilbert Hemink, Landgraaf (NL)

(73) Assignee: Ford Global Technologies, LLC, Dearborn, MI (US)

( * ) Notice: Subject to any disclaimer, the term of this patent is extended or adjusted under 35 U.S.C. 154(b) by 1079 days.

(21) Appl. No.: 13/934,140

(22) Filed: Jul. 2, 2013

(65) Prior Publication Data
US 2014/0069372 A1    Mar. 13, 2014

(30) Foreign Application Priority Data

Sep. 7, 2012   (DE) .......................... 10 2012 215 882

(51) Int. Cl.
*F02B 69/06*      (2006.01)
*F02D 41/00*      (2006.01)
(Continued)

(52) U.S. Cl.
CPC ............ *F02D 41/0002* (2013.01); *F01L 1/08* (2013.01); *F01L 1/181* (2013.01); *F01L 1/38* (2013.01);
(Continued)

(58) Field of Classification Search
CPC ... F01L 13/0036; F02D 41/3058; F02B 69/06
(Continued)

(56) References Cited

U.S. PATENT DOCUMENTS 2,197,282 A * 4/1940 Walker .................... F01L 13/00
                                                          123/321
4,353,334 A * 10/1982 Neitz ....................... F01L 13/00
                                                          123/179.21
(Continued)

FOREIGN PATENT DOCUMENTS

CN       102510936 A       6/2012
DE        60117553 T2      8/2006
(Continued)

OTHER PUBLICATIONS

Partial Translation of Office Action of Chinese Patent Application No. 201310400008.2, Issued Dec. 5, 2016, State Intellectual Property Office of PRC, 9 pages.

*Primary Examiner* — Hieu T Vo
*Assistant Examiner* — Arnold Castro
(74) *Attorney, Agent, or Firm* — Julia Voutyras; McCoy Russell LLP

(57) ABSTRACT

Systems and methods are provided for operating an internal combustion engine in a two-stroke mode or a four-stroke mode to achieve greater fuel efficiency and minimize emissions. The system comprises a mode-adaptable valve; a valve rocker arm to actuate opening and closing of the mode adaptable valve; a cam follower of a first cam for carrying out a two-stroke mode; a cam follower of a second cam for carrying out a four-stroke mode; and a pin to mechanically couple the valve rocker arm to the cam follower of the first cam or the cam follower of the second cam. Coupling the valve rocker arm to the cam follower of the first cam enables a two-stroke mode and coupling the valve rocker arm to the cam follower of the second cam enables a four-stroke mode.

17 Claims, 5 Drawing Sheets

(51) Int. Cl.
*F02D 41/30* (2006.01)
*F01L 1/38* (2006.01)
*F01L 1/08* (2006.01)
*F01L 1/18* (2006.01)
*F01L 13/00* (2006.01)
*F02M 26/06* (2016.01)
*F01L 1/14* (2006.01)
*F01L 1/053* (2006.01)

(52) U.S. Cl.
CPC ...... *F01L 13/0036* (2013.01); *F02D 41/3058* (2013.01); *F02M 26/06* (2016.02); *F01L 1/146* (2013.01); *F01L 2001/0537* (2013.01); *F02D 2041/001* (2013.01); *Y02T 10/42* (2013.01)

(58) Field of Classification Search
USPC .................................................. 123/21, 90
See application file for complete search history.

(56) References Cited

U.S. PATENT DOCUMENTS

| | | | |
|---|---|---|---|
| 6,273,076 B1* | 8/2001 | Beck | F02B 29/0418 |
| | | | 123/562 |
| 6,286,467 B1 | 9/2001 | Ancheta | |
| 7,036,465 B2 | 5/2006 | Burk et al. | |
| 2005/0205019 A1* | 9/2005 | Burk | F01L 1/08 |
| | | | 123/21 |
| 2006/0272598 A1* | 12/2006 | Wakeman | F01L 1/08 |
| | | | 123/21 |
| 2009/0277434 A1* | 11/2009 | Surnilla | F01L 9/04 |
| | | | 123/65 R |
| 2010/0063706 A1* | 3/2010 | Surnilla | F02D 13/0211 |
| | | | 701/102 |
| 2010/0175652 A1* | 7/2010 | Schoeneberg | F01L 1/047 |
| | | | 123/90.21 |
| 2012/0024246 A1* | 2/2012 | Klingbeil | F01L 1/26 |
| | | | 123/90.16 |
| 2012/0137997 A1* | 6/2012 | Hayman | F01L 1/185 |
| | | | 123/90.16 |
| 2013/0333665 A1* | 12/2013 | Pursifull | F02B 37/04 |
| | | | 123/399 |
| 2014/0069372 A1* | 3/2014 | Tietze | F02D 41/0002 |
| | | | 123/345 |

FOREIGN PATENT DOCUMENTS

DE 102007002802 A1 7/2008
GB 2430709 A 4/2007

* cited by examiner

INTERNAL COMBUSTION ENGINE WHICH MAY BE SELECTIVELY OPERATED BY THE TWO-STROKE METHOD OR THE FOUR-STROKE METHOD AND METHOD FOR OPERATING SUCH AN INTERNAL COMBUSTION ENGINE

CROSS REFERENCE TO RELATED APPLICATIONS

The present application claims priority to German Patent Application No. 102012215882.0, filed on Sep. 7, 2012, the entire contents of which are hereby incorporated by reference for all purposes.

TECHNICAL FIELD

The present application relates to an internal combustion engine that may be operated in a two-stroke or a four-stroke mode.

BACKGROUND AND SUMMARY

As a result of the intermittent combustion of modern internal combustion engines, exhaust gases may be discharged after combustion from the at least one cylinder in the context of a gas exchange and to supply charging air or a fresh admixture again. In principle, two-stroke methods and four-stroke methods may be distinguished from each other. First, the gas exchange of the four-stroke method is discussed in greater detail below.

In the four-stroke method, the discharge of the combustion gases is brought about in the context of the gas exchange via the outlet openings and the cylinder is filled with a fresh admixture or charging air via the inlet openings. The outlet openings and the inlet openings, may both also be referred to as simply openings.

In four-stroke engines, globe valves are used almost exclusively to control the gas exchange and carry out an oscillating travel movement during the operation of the internal combustion engine, and thereby open and close the inlet and outlet openings, respectively.

The valve actuation mechanism required for the movement of the valves, including the valves themselves, is referred to as a valve train. The function of the valve train is to open or close the inlet and outlet openings of the cylinders at the correct time, with it being desirable to have rapid opening of flow cross sections which are as large as possible in order to keep the throttle losses low in the incoming and outgoing gas flows and to ensure that the cylinders are filled with a fresh admixture as well as possible and to ensure effective discharge of the combustion gases. The cylinders may also be provided with two or more inlet and outlet openings. The internal combustion engine to which the present disclosure relates may also be operated with the four-stroke method, where applicable, for which reason the at least one cylinder has at least one outlet opening and at least one inlet opening.

The globe valves which may be moved, that is to say, displaced, along their longitudinal axis between a valve closure position and a valve opening position in order to release or block an opening of a cylinder. On the one hand, resilient valve devices are provided to actuate a valve, in order to pre-tension the valve in the direction of the valve closure position and, on the other hand, a valve actuation device is used in order to open the valve counter to the pre-tensioning force of the resilient valve device.

The valve actuation device comprises at least one camshaft, on which a plurality of cams, in this instance at least two cams, are arranged and which is caused to rotate by the camshaft—for example, by a chain drive—in the four-stroke method in such a manner that the camshaft rotates with the cams at half the speed of the camshaft. An operating cycle extends over two camshaft rotations and comprises four operating phases, that is to say, the compression and expansion as a result of the combustion of the fuel/air admixture in addition to the intake and discharge.

In principle, a distinction is made between a lower camshaft and an upper camshaft, reference being made to the plane of separation between the cylinder head and the cylinder block.

Bottom-mounted camshafts are suitable for actuating so-called side-by-side valves but also using push rods and levers, for example, pivot levers or tilting levers, for actuating overhead valves. Side-by-side valves are opened by being displaced upwards whereas overhead valves are opened by a downward movement. A tappet is generally used as an intermediate element and is intended to be engaged with the cam of the camshaft at least during the opening and closing operation.

However, overhead camshafts are used exclusively for actuating overhead valves, a valve train having an overhead camshaft having as an additional valve train component a pivot lever, a tilting lever or a tappet. The pivot lever rotates about a fixed rotation location and, in the event of deflection by the cam, displaces the valve counter to the pre-tensioning force of the resilient valve device in the direction of the open valve position. In the case of a tilting lever which may be pivoted about a centrally arranged center of rotation, the cam engages at one end of the tilting lever, the valve being arranged at the opposite end of the lever. It is advantageous when overhead camshafts are used that the moved mass of the valve train is reduced in particular by dispensing with the push rod and the valve train is more rigid, that is to say, less resilient. At least two bearings which are arranged generally in or on the cylinder head in the case of overhead camshafts are intended to be provided to receive and support the camshaft. If a tappet is used as a cam follower, the tappet is positioned on the end of the globe valve remote from the combustion chamber so that the tappet participates in the oscillating travel movement of the valve when the cam is in engagement with the tappet in the region of the cam lug and deflects it.

In the context of the present disclosure, intermediate elements of the valve actuation device, that is to say, valve train components which are located, that is to say, arranged, in the force path between the cam and the valve are referred to as cam followers, that is to say, they are combined using that term.

In contrast to the above-described four-stroke method, the gas exchange in the two-stroke method is not carried out by discharge and intake by an oscillating piston but instead by the combustion chamber being purged with charging air or a fresh admixture using a pressure drop generated over the combustion chamber, the so-called purging pressure drop.

In a two-stroke engine, slots may be provided for the gas exchange in the cylinder, that is to say, in the cylinder pipe. These slots may be controlled by an oscillating piston, that is to say, they are opened in order to supply charging air and/or to discharge the exhaust gases and are closed for compression and expansion. An operating cycle extends over a camshaft rotation and comprises two operating phases, compression and expansion, following the combustion of the fuel/air admixture. The operating phases intake and discharge are dispensed with or are replaced by a purging operation.

The two-stroke method has several advantages in relation to the four-stroke method, some of which may be attributed to the fact that the operating cycle according to the two-stroke method extends over one crankshaft rotation whereas it extends over two crankshaft rotations in the case of the four-stroke method. In principle, the two-stroke method is characterized by a lower friction action. Furthermore, the engine speed may be reduced, for example, the idling speed may be halved. As a result of the doubled number of operating cycles for the same crankshaft speed, it is further possible to perceptibly increase the maximum torque or—provided that the torque supply remains the same—to reduce the mean pressure. Advantages result in conjunction with the acoustics of the internal combustion engine, which contributes substantially to the overall noise emission of the motor vehicle. By the mean pressure being reduced, the combustion temperatures may be reduced, whereby it is possible to counteract the formation of nitrogen oxides and/or soot. Owing to the smaller mechanical and thermal loads, the internal combustion engine could be constructed in a more filigreed manner with materials being saved, whereby in particular the weight but also costs are reduced.

In comparison with the four-stroke method, however, the two-stroke method also has disadvantages which may mainly be attributed to the poorer, that is to say, not very effective, gas exchange, that is to say, the purging. Owing to the purging, the two-stroke method results in substantially higher emissions of unburnt hydrocarbons and carbon monoxide, the purging of the combustion chamber with charging air or a fresh admixture becoming increasingly poor, that is to say, more inefficient, with increasing speed $\eta_{mot}$, for which reason two-stroke methods are less suitable for high speeds in principle.

In order to be able to use the advantages of the two-stroke method, internal combustion engines which may be operated both by two-stroke methods and by four-stroke methods are being developed. In order to change the internal combustion engine from the two-stroke method to the four-stroke method, that is to say, to switch to the four-stroke method, various concepts have been developed.

The translation of European patent specification DE 601 17 553 T2 describes a selectable camshaft drive for an internal combustion engine which may be selectively operated using the two-stroke method or four-stroke method. The at least one camshaft is permanently in engagement with a planet gear mechanism which is driven by the camshaft. The camshaft is driven either in accordance with the two-stroke method at the camshaft speed or in accordance with the four-stroke method at half the camshaft speed, the gas exchange being carried out via the inlet openings and the outlet openings of the cylinders which are controlled in both operating modes using the at least one camshaft by cams.

Against the background of the above, an objective of the present disclosure is to provide an internal combustion engine may be readily changed from the two-stroke method to the four-stroke method—and vice versa. In the internal combustion engine according to the present disclosure, the at least one camshaft of the valve actuation device for actuating at least one valve has different cams which are used, that is to say, are active, in accordance with the current operating method, respectively.

Since the internal combustion engine in this instance may also have a single cylinder having a single outlet opening and the gas exchange according to the two-stroke method does not have to make use of the at least one inlet opening of the cylinder in each case, but may also be carried out via inlet slots, the camshaft has according to the disclosure a pair of different cams for at least one valve, that is to say, in this instance for the at least one outlet valve of the at least one cylinder.

Such a valve which may selectively be actuated by a first cam or by a second cam in order to be controlled and actuated in accordance with the two-stroke method or in accordance with the four-stroke method, is referred to as a mode-adaptable valve in the context of the present disclosure because the valve actuation or the valve actuation device is adapted to the operating mode, that is to say, the cam used is selected in accordance with the operating mode selected.

In some embodiments both the inlet valves and the outlet valves may be constructed as mode-adaptable valves, the actuation of the inlet valves and the outlet valves being able to be carried out via a common camshaft or via separate camshafts, that is to say, at the input side via an input camshaft and at the output side via an output camshaft. Logically, the valve actuation device of the internal combustion engine according to the disclosure may comprise at least one camshaft having a plurality of cams in order to actuate the valves.

In order to be able to change, that is to say, switch, the cam for actuation in the case of a mode-adaptable valve, the valve train may be constructed so as to be switchable, according to the disclosure in such a manner that the actuation of the valve is carried out in the four-stroke mode by the second cam and in the two-stroke mode by the first cam. In the context of the description of the advantageous embodiments, examples of a valve train which may be switched in that manner are set out.

According to the disclosure, there is arranged in the intake system of the internal combustion engine a mechanical charger, with which a positive pressure drop may be generated over the combustion chamber at any time and operating point of the internal combustion engine, in order to be able to carry out an effective purging operation according to the two-stroke method.

Systems and methods are provided for operating an internal combustion engine in a two-stroke mode or a four-stroke mode to achieve greater fuel efficiency and minimize emissions. The system comprises a mode-adaptable valve; a valve rocker arm to actuate opening and closing of the mode adaptable valve; a cam follower of a first cam for carrying out a two-stroke mode; a cam follower of a second cam for carrying out a four-stroke mode; and a pin to mechanically couple the valve rocker arm to the cam follower of the first cam or the cam follower of the second cam. Coupling the valve rocker arm to the cam follower of the first cam enables a two-stroke mode and coupling the valve rocker arm to the cam follower of the second cam enables a four-stroke mode.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

DETAILED DESCRIPTION

Figure 1:
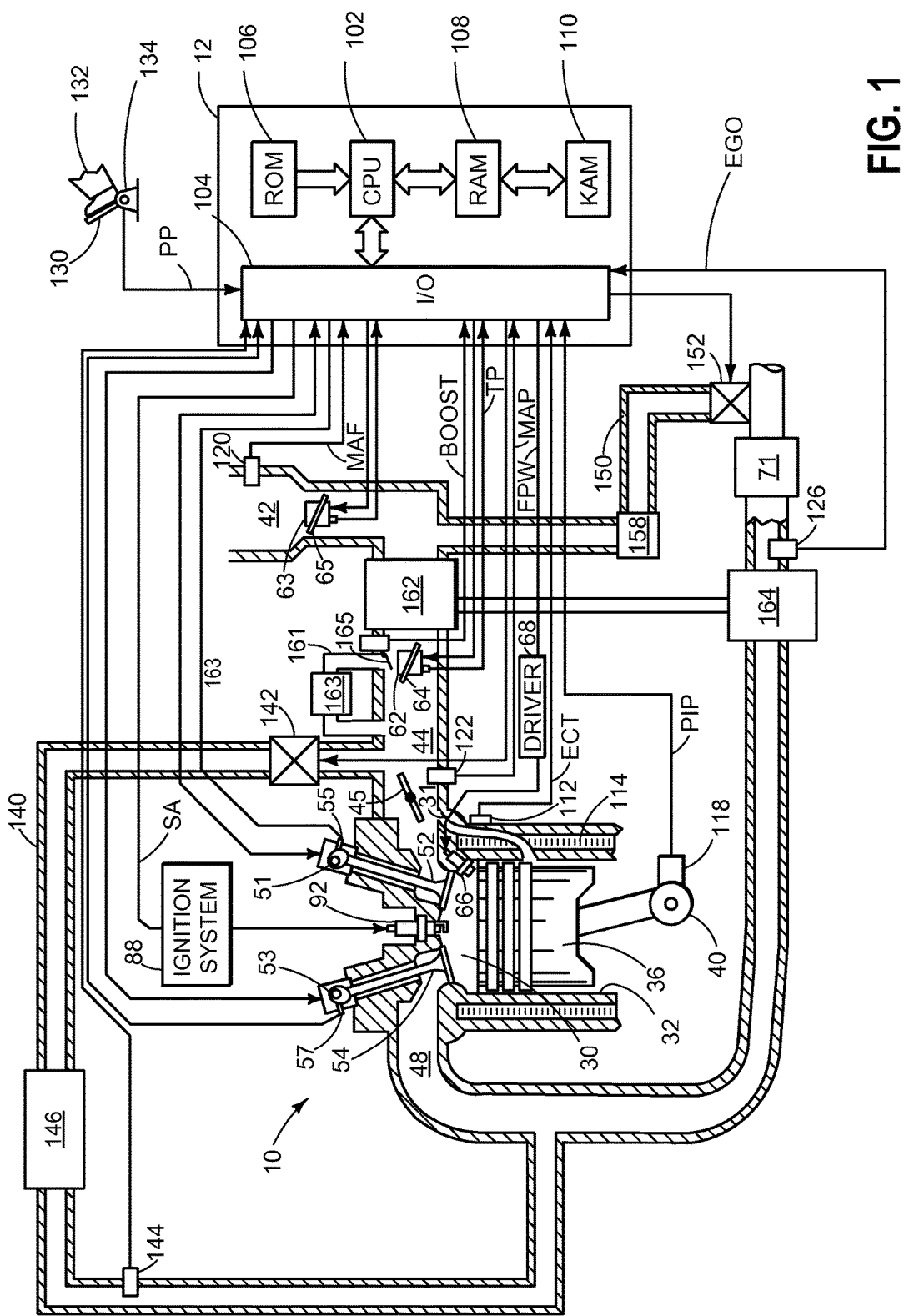
FIG. 1 is a schematic view of an example cylinder of an internal combustion engine.

Referring now to FIG. 1, is a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 may selectively communicate with combustion chamber 30 via respective intake valve 52 and exhaust valve 54. In some embodiments, combustion chamber 30 may include two or more intake valves and/or two or more exhaust valves. Cylinder 30 may include an additional opening 31 which may be configured as at least one slot and is controlled by a piston oscillating in the cylinder for supplying charging air.

The gas exchange during the two-stroke method, that is to say, in the two-stroke mode, may also make use of other openings—other than the inlet openings or outlet openings of the cylinder. Thus, there may be provided slots in the cylinder 30 for introducing charging air and/or for discharging exhaust gases. The piston oscillating in the cylinder 30 controls the at least one slot preferably in such a manner that the piston opens the slot when passing through bottom dead center in order to allow the gas exchange.

Alternative concepts relating to the gas exchange during the two-stroke method combine the inlet openings and/or outlet openings of the cylinder with additional openings. Thus, a slot provided in the cylinder may be used for introducing the charging air and the at least one outlet opening of the cylinder may be used for discharging the exhaust gas. In this instance, not the inlet opening but instead the at least one outlet opening of the cylinder would have to be provided with a mode-adaptable valve in order to be able to use that outlet opening both for the gas exchange in the two-stroke method and for the gas exchange in the four-stroke method.

Therefore, embodiments of the internal combustion engine are also advantageous in which the at least one outlet opening of the at least one cylinder is provided with a mode-adaptable valve.

For the reasons mentioned above, embodiments of the internal combustion engine are also advantageous in which the at least one cylinder has at least one additional opening for supplying charging air. If the at least one cylinder has at least one additional opening for supplying charging air, embodiments are advantageous in which the at least one cylinder has at least one slot which acts as an additional opening and which may be controlled by a piston oscillating in the cylinder for supplying charging air.

In cylinder 30 intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

The cam actuation systems 51 and 53 may represent elements of a valve train in accordance with the present disclosure, described in greater detail below in reference to FIGS. 2 and 3. The cam actuation systems 51 and 53 may control a mode-adaptable valve. The mode-adapatable valve may be capable of altering valve timing such that an engine may be operated in a four-stroke or a two-stroke mode. Embodiments of the internal combustion engine are advantageous in which the valve actuation device for actuating the valves comprises a plurality of cam followers associated with cam and a valve rocker arm arranged in the force path between a cam and a valve in such a manner that the valve carries out an oscillating travel movement when the camshaft rotates. Embodiments of the internal combustion engine are advantageous in which both the at least one inlet opening and the at least one outlet opening of the at least one cylinder are provided with a mode-adaptable valve.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 may provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark. In some embodiments, the ignition system may include a dual spark system which includes two spark plugs per cylinder (not shown).

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Intake passage 42 may include a mass air flow sensor 120 and a manifold air pressure sensor 122 for providing respective signals MAF and MAP to controller 12. Further, intake manifold 44 may include charge motion control valve 45 for controlling the intensity of charge motion occurring in combustion chamber 30.

Further, in the disclosed embodiments, an exhaust gas recirculation (EGR) system may route a desired portion of exhaust gas from exhaust passage 48 to intake passage 44 via high-pressure EGR (HP-EGR) passage 140 and/or low-pressure EGR (LP-EGR) passage 150. The amount of EGR provided to intake passage 44 may be varied by controller 12 via HP-EGR valve 142 or LP-EGR valve 152. In some embodiments, a throttle may be included in the exhaust to assist in driving the EGR. Further, an EGR sensor 144 may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high-pressure EGR system where EGR is routed from upstream of a turbine of a turbocharger to downstream of a compressor of a turbocharger and a low-pressure EGR system where EGR is routed from downstream of a turbine of a turbocharger to upstream of a compressor of the turbocharger. Further, as shown in FIG. 1, the HP-EGR system may include HP-EGR cooler 146 and the LP-EGR system may include LP-EGR cooler 158 to reject heat from the EGR gasses to engine coolant, for example. In alternative embodiments, engine 10 may include only an HP-EGR system or only an LP-EGR system.

Exhaust gas recirculation (EGR), that is to say, the return of combustion gases from the output side to the input side, is advantageous, in which the nitrogen oxide emissions may be substantially reduced with an increasing exhaust gas recirculation rate. The exhaust gas recirculation rate $x_{EGR}$ is determined by $x_{EGR}=m_{EGR}/(m_{EGR}+m_{Fresh\ air})$, where $m_{EGR}$ indicates the mass of returned exhaust gas and $m_{Fresh\ air}$ indicates the fresh air supplied. In order to achieve a substantial reduction in nitrogen oxide emissions, it may be useful to have high exhaust gas recirculation rates which may be in the order of magnitude of $x_{EGR}\approx 60\%$ to 70%.

When an internal combustion engine is operated with exhaust gas turbocharging and the simultaneous use of exhaust gas recirculation, a conflict may arise if the returned exhaust gas is removed from the exhaust gas discharge system upstream of the turbine by high-pressure EGR and is no longer available for driving the turbine.

When the exhaust gas recirculation rate is increased, the exhaust gas mass flow introduced into the turbine simultaneously decreases. The reduced exhaust gas mass flow through the turbine brings about a smaller turbine pressure ratio, whereby the charging pressure ratio also decreases, which is equivalent to a smaller compressor mass flow. In addition to the decreasing charging pressure, additional problems may arise during the operation of the compressor concerning the pump limit of the compressor. Disadvantages may also arise in terms of pollutant emissions, for example, with regard to soot formation in diesel engines during acceleration.

For this reason, there are required concepts which ensure sufficiently high charging pressures with high exhaust gas recirculation rates at the same time, in particular during partial load operation. So-called low-pressure EGR offers an approach for a solution.

In contrast to the high-pressure EGR already mentioned, which removes exhaust gas from the exhaust gas discharge system upstream of the turbine and introduces it into the intake system downstream of the compressor, exhaust gas which has already flowed through the turbine is returned to the input side in the case of low-pressure EGR. To that end, the low-pressure EGR comprises a return line which branches off from the exhaust gas discharge system downstream of the turbine and opens into the intake system upstream of the compressor.

The exhaust gas recirculated to the input side by low-pressure EGR is mixed with fresh air upstream of the compressor or in the compressor. The admixture of fresh air and returned exhaust gas thereby produced forms the charging air which is compressed in the compressor, the compressed charging air being able to be compressed again in this instance in the mechanical charger downstream of the compressor and/or being able to be cooled in the charging air cooler.

It is harmless that exhaust gas is directed through the compressor in the context of the low-pressure EGR because exhaust gas which has been subjected to an exhaust gas reprocessing operation, in particular in the particulate filter, downstream of the turbine, is generally used. Deposits in the compressor which change the geometry of the compressor, in particular the flow cross sections, and thereby worsen the degree of efficiency of the compressor do not therefore have to be a cause for concern.

For the reasons mentioned above, embodiments are advantageous in which there is provided an exhaust gas recirculation system which comprises a return line which branches off from the exhaust gas discharge system downstream of the turbine and opens into the intake system upstream of the compressor.

Embodiments of the internal combustion engine are advantageous in which a bypass line is provided for circumventing the mechanical charger, which bypass line branches off from the intake system upstream of the charger and opens into the intake system again downstream of the charger, a blocking element being arranged in the bypass line.

According to the disclosure, there is arranged in the intake system of the internal combustion engine a mechanical charger with which the charging air may be compressed before being introduced into the at least one cylinder. In principle, it is possible to compress the charging air in two steps by the mechanical charger and the exhaust gas turbocharger.

In embodiments in which a compressor of an exhaust gas turbocharger is arranged in the intake system in addition to the mechanical charger which is provided in an obligatory manner, a functional division is preferably sought in that the mechanical charger takes on the compression of the charging air at low speeds and generates a purging gradient and the compressor of the exhaust gas turbocharger is responsible for the charging at relatively high speeds, the mechanical charger preferably being circumvented via a bypass line.

This method allows the charger to be configured for small charging air mass flows, that is to say, for low speeds, and the compressor of the turbocharger to be configured for great charging air mass flows, as occur at relatively high speeds.

If an exhaust gas turbocharger is provided, embodiments of the internal combustion engine are advantageous for the above-mentioned reasons in which the compressor of the at least one exhaust gas turbocharger is configured for relatively large charging air mass flows, for example, for charging air mass flows which occur above a predetermined speed $n_{mot,threshold}$.

Engine 10 may further include a compression device such as a turbocharger or supercharger, or both. For a turbocharger, compressor 162 may be at least partially driven by a turbine 164 (e.g., via a shaft) arranged along exhaust passage 48. Engine 10 may be further equipped with a mechanical charger 163 (also referred to as a supercharger) in series with the turbocharger compressor 162. The mechanical charger may furthermore be located in a bypass line 161 configured with a blocking element 165 which may be capable of preventing air from entering mechanical charger 163 when dictated by engine operating conditions. The mechanical charger may be used for compressing intake air. The blocking element arranged in the bypass line may be adjusted in the direction of the closure position in the context of switching the internal combustion engine from the four-stroke mode to the two-stroke mode in order to increase the charging air flow guided by the mechanical charger. Thus, the amount of compression provided to one or more cylinders of the engine via a turbocharger or mechanical charger may be varied by controller 12.

Embodiments of the internal combustion engine are advantageous in which there is provided at least one exhaust gas turbocharger which comprises a turbine arranged in the exhaust gas discharge system and a compressor arranged in the intake system, the compressor being provided upstream of the mechanical charger in the intake system.

The charging is primarily a method for increasing power, in which the charging air required for the engine combustion process is compressed, whereby a greater quantity of charging air may be supplied to each cylinder per operating cycle. The quantity of fuel and therefore the mean pressure may thereby be increased.

In this instance, at least one exhaust gas turbocharger is used for the charging—in addition to the mechanical charger—wherein a compressor and a turbine are arranged on the same shaft, the hot exhaust gas flow being supplied to the turbine via an exhaust gas discharge system, expanding in that turbine with a release of energy and causing the shaft to rotate. The energy transmitted from the exhaust gas flow to the shaft is used for driving the compressor which is also arranged on the shaft. The compressor conveys and compresses the charging air supplied to it via an intake system, whereby charging of the at least one cylinder is achieved. A charging air cooler, with which the compressed charging air is cooled before being introduced into the at least one cylinder, is preferably provided in the intake line downstream of the compression. The cooler reduces the temperature and therefore increases the density of the charging air so that the cooler also contributes to increased filling of the cylinders, that is to say, to a greater quantity of air. A compression by cooling is brought about to a degree. If a charging air cooler is provided, that cooler is preferably provided with a bypass for circumvention.

The advantage of an exhaust gas turbocharger, for example, in comparison with a mechanical charger, is that a mechanical connection to transmit power between the charger and the internal combustion engine may be avoided. Whereas a mechanical charger draws the energy for its drive directly from the internal combustion engine, the exhaust gas turbocharger uses the exhaust gas energy of the hot exhaust gases.

On the other hand, an exhaust gas turbocharger requires a sufficiently large mass flow of exhaust gas in order to be able to produce the charging pressure required. If the level falls below a specific speed, there is often observed a decrease in torque which becomes comprehensible if account is taken of the fact that the charging pressure ratio depends on the turbine pressure ratio. If, for example, the engine speed is reduced in a diesel engine, this results in a smaller mass flow of exhaust gas and therefore in a smaller turbine pressure ratio. This has the consequence that the charging pressure ratio also decreases towards lower speeds, which is equivalent to a torque decrease.

The torque of a charged internal combustion engine may be increased in that a plurality of turbines arranged in parallel or in series are used, the turbines being configured for specific exhaust gas quantities.

The charging is a suitable method of increasing the power of an internal combustion engine without changing the piston capacity, or of reducing the piston capacity for the same power. In any case, the charging results in an increase of the power/volume ratio and a more favorable performance measurement. Under identical peripheral vehicle conditions, the load spectrum may thus be displaced towards higher loads at which the specific fuel consumption is lower.

Consequently, the charging supports the constant efforts in the development of internal combustion engines to minimize fuel consumption, that is to say, to improve the degree of efficiency of the internal combustion engine. Advantages in terms of exhaust gas emissions may also be achieved when the charging operation is selectively configured. Thus, for example, the nitrogen oxide emissions may be reduced in the diesel engine without any losses in the degree of efficiency by suitable charging.

In order to operate an internal combustion engine which has a bypass line for circumventing the mechanical charger, in which bypass line a blocking element is arranged, method variants are advantageous in which the blocking element is adjusted in the direction of the closure position in the context of switching the internal combustion engine from the four-stroke mode to the two-stroke mode in order to increase the charging air flow guided by the mechanical charger.

An objective of the mechanical charger is to provide a purging gradient for the purpose of exchanging the gas in the context of the two-stroke method. In that regard, it is advantageous to adjust the blocking element in the direction of the closure position if the internal combustion engine is changed to the two-stroke mode or is operated in the two-stroke mode.

In order to operate an internal combustion engine with at least one exhaust gas turbocharger, method variants are advantageous in which the compressor of the at least one exhaust gas turbocharger is configured for relatively large charging air mass flows which occur above the predetermined speed $\eta_{mot,threshold}$.

Exhaust gas sensor 126 is shown coupled to exhaust passage 48 upstream of emission control system 70 and downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Emission control device 71 is shown arranged along exhaust passage 48 downstream of exhaust gas sensor 126. Emission control devices 71 may be a selective catalytic reduction (SCR) system, three way catalyst (TWC), $NO_x$ trap, various other emission control devices, or combinations thereof. For example, device 71 may be a TWC and device 72 (not shown in FIG. 1) may be a particulate filter (PF). Further, in some embodiments, during operation of engine 10, emission control device 71 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor may give an indication of engine torque. Further, this sensor, along with the detected engine speed, may provide an estimate of charge (including air) inducted into the cylinder. In one example, sensor 118, which is also used as an engine speed sensor, may produce a predetermined number of equally spaced pulses per a revolution of the crankshaft.

Storage medium read-only memory 106 may be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

Figure 2B:
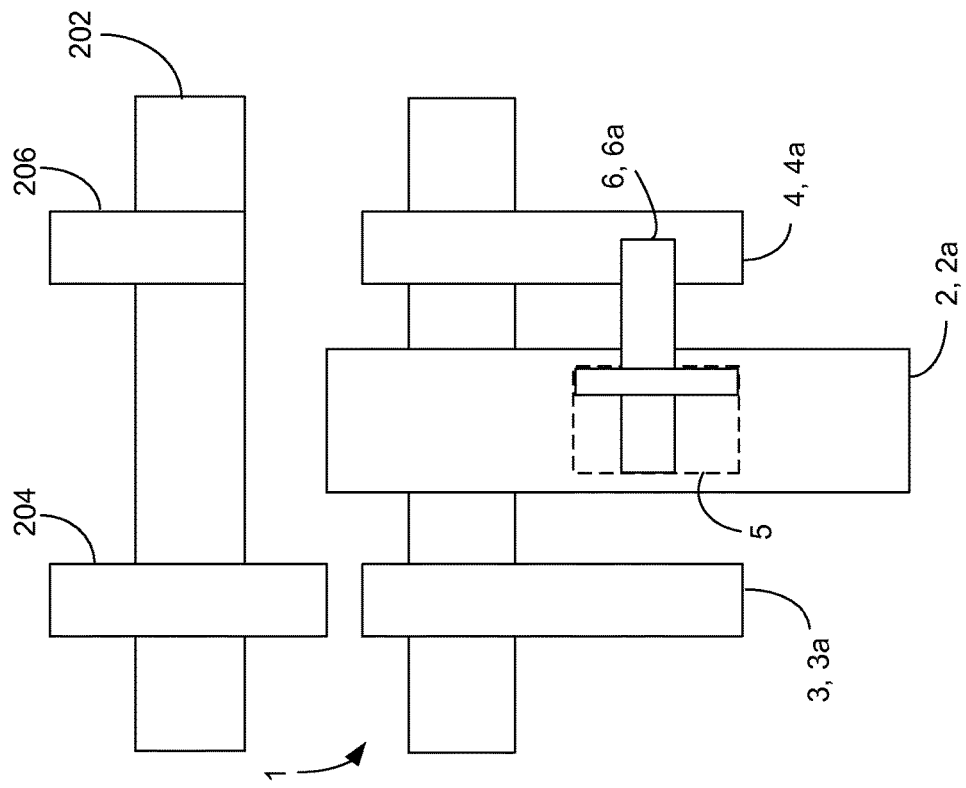
FIG. 2b is a schematic view of portions of the switchable valve train of a first embodiment of the internal combustion engine in a switching state according to the four-stroke mode and FIG. 3 is a perspective view of an example switchable valve train in accordance with the present disclosure.
Figure 2A:
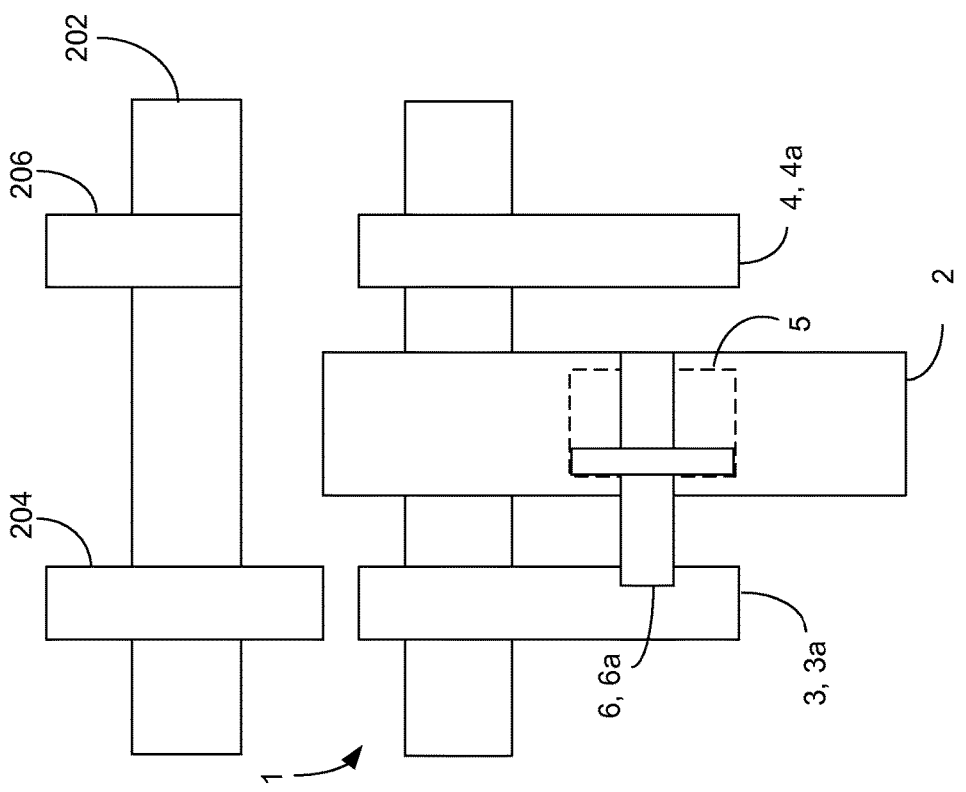
FIG. 2a is a schematic view of portions of the switchable valve train of a first embodiment of the internal combustion engine in a switching state according to the two-stroke mode.

Turning now to FIG. 2a, a schematic view of portions of the switchable valve train 1 of a first embodiment of the internal combustion engine in a first switching state is shown. FIG. 2b shows that valve train 1 in a second switching state.

Two cams 204 and 206 on camshaft 202 may be used to actuate the mode-adaptable valve. A first cam 204 serves to actuate the mode-adaptable valve in the two-stroke mode and a second cam 206 serves to actuate the mode-adaptable valve in the four-stroke mode. It should be appreciated that more cams may be located along the length of camshaft 202 and that cams shown are those associated with a single mode-adaptable valve.

A valve rocker arm 2 may be associated with a valve (shown at 302 in FIG. 3) which is arranged in the force path between the activated cam and the valve is illustrated in the center. Two cam followers 3, 4 comprising tilting levers 3a and 4a (pictured in FIG. 3), may be associated with cams 204 and 206 respectively and which may be mechanically coupled to the valve rocker arm 2. A pin 6 which is displaceably supported in a chamber 5 and which is hydraulically actuated may be used to mechanically couple tilting levers 3a and 4a to valve rocker arm 2. The mechanical coupling of the tilting levers 3a or 4a to the valve rocker arm 2 by pin 6 may be on an individual basis, such that tilting lever 3a may be individually, mechanically coupled to valve rocker arm 6 and separately tiling lever 4a may be individually couple to valve rocker arm 6. In this way, the oscillating movement of either the first cam 204 or the second cam 206 may be transferred to the mode-adaptable valve by the valve rocker arm 2.

According to FIG. 2a, the first cam follower 3 associated with the first cam 204 is mechanically coupled to the valve rocker arm 2 associated with the valve in order to actuate the mode-adaptable valve in the two-stroke mode of the internal combustion engine in accordance with the two-stroke method by the first cam.

According to FIG. 2b, the second cam follower 4 associated with the second cam 206 is mechanically coupled to the valve rocker arm 2 associated with the valve in order to actuate, that is to say, redirect, the mode-adaptable valve in the four-stroke mode in accordance with the four-stroke method by the second cam.

The valve train 1 illustrated in FIGS. 2a and 2b is constructed so as to be able to be switched hydraulically in such a manner that the actuation of the at least one mode-adaptable valve in the four-stroke mode is carried out by the second cam and in the two-stroke mode by the first cam.

Embodiments of the internal combustion engine are advantageous in which the at least one valve rocker arm is a tilting lever and/or the at least two cam followers connect to tilting levers. By using tilting levers, sufficient structural space is provided to be able to construct the valve train as a switchable valve train, that is to say, to provide a mechanism with which a cam follower may be mechanically coupled to a valve rocker arm.

As already set out, so-called cam followers may be used for actuating the valves and are arranged in the force path between the cam and the valve. Example cam followers are tappets, tilting levers or pivot levers. An advantageous aspect of the use of cam followers is that those elements are particularly suitable for being configured or constructed as switchable elements. Thus, a tappet may readily be constructed as a hydraulically connectable cam follower which is acted upon with oil pressure so that the tappet which is then connected and acts as a cam follower located in the force path transmits forces from the cam to the mode-adaptable valve or is separated from the oil pressure in order to prevent the force transmission from the cam to the valve in the disconnected state.

For the reasons mentioned, embodiments of the internal combustion engine are also advantageous in the present context in which two cam followers which may be mechanically coupled to the valve rocker arm are provided for the two different cams of the at least one mode-adaptable valve, a first cam follower associated with the first cam being able to be mechanically connectable to the valve rocker arm in order to actuate the mode-adaptable valve in the two-stroke mode by the first cam, and a second cam follower associated with the second cam being able to be mechanically coupled to the valve rocker arm in order to actuate the valve in the four-stroke mode by the second cam.

Figure 3:
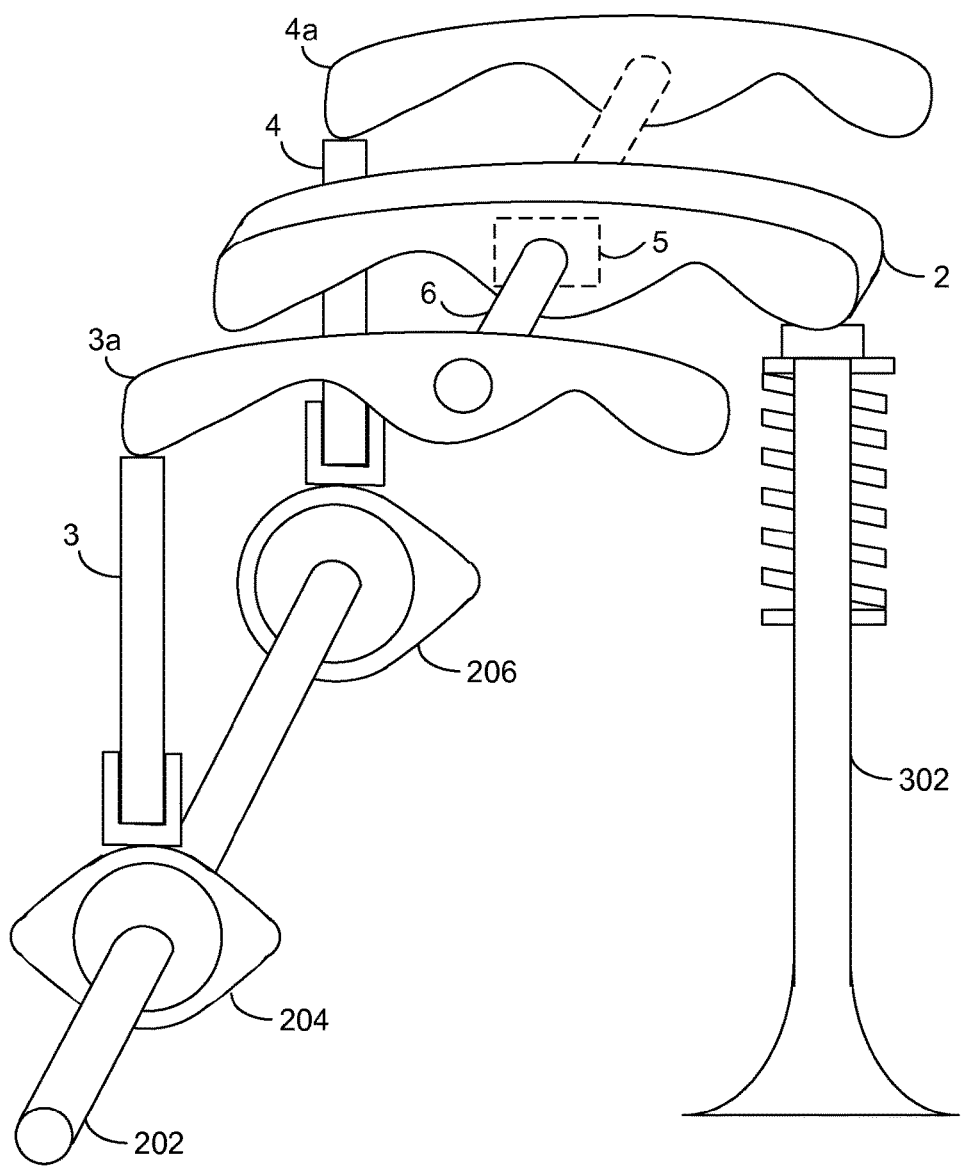

Turning now to FIG. 3, a perspective view of a valve train for a mode-adaptable valve is shown. The first cam 204 and the second cam 206 are arranged on camshaft 202. The first cam 204 has two lobes such that when its associated tilting lever 3a is connected by the pin 6 to the valve rocker arm 2 the valve 302 may be opened twice per every revolution of the camshaft 202. Conversely, the second cam 206 has a single lobe so that per every revolution of the camshaft, valve 302 may open once.

The valve 302 is in contact with valve rocker arm 2. The valve rocker arm is itself not in direct contact to the camshaft but may be mechanically connectable to tilting lever 3a or 4a based on the movement of a pin 6 within the chamber 5. The movement of the pin 6 is what determines the mode of the mode-adaptable valve 302.

The tilting levers 3a and 4a are in continuous contact with the cams of camshaft 202 via cam follower 3 and 4 respectively. The two cams 204 and 206 are shaped and aligned with the rotary motion of the camshaft 202 so that they may operate the valve 302 in either a two-stroke or four-stroke fashion respectively.

This embodiment is advantageous for implementing concepts in which the gas exchange is carried out both with the four-stroke method and with the two-stroke method via the openings of the at least one cylinder, that is to say, the introduction of the charging air is carried out via inlet openings and the discharge of the exhaust gases is carried out via outlet openings. In the context of the gas exchange, a pressure drop is also generated, preferably by a mechanical charger, to purge the combustion chamber in order to promote or to allow the gas exchange in the two-stroke method.

Figure 4:
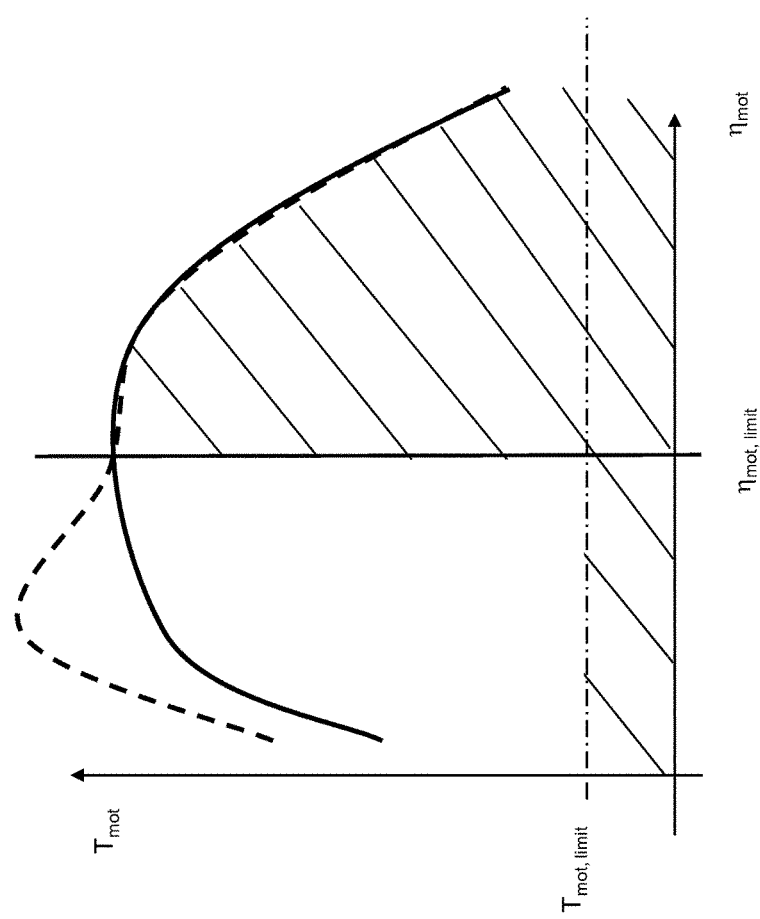
FIG. 4 is a schematic engine characteristic diagram of a first embodiment of the internal combustion engine in which the application ranges of the two-stroke method and the four-stroke method are indicated.

FIG. 4 is the schematic engine characteristic diagram of a first embodiment of the internal combustion engine in which the application ranges of the two-stroke method and the four-stroke method are indicated.

As illustrated in FIG. 4, the two-stroke method is used in the lower speed range if the load $T_{mot}$ of the internal combustion engine is greater than a predetermined load $T_{mot,threshold}$ (non-hatched characteristic diagram range). If the load $T_{mot}$ falls below the indicated threshold load $T_{mot,threshold}$ and/or if the speed $\eta_{mot}$ of the internal combustion engine exceeds a specific speed $\eta_{mot,threshold}$, the internal combustion engine is switched to the four-stroke mode by the pin 6 in the valve train being switched such that the movement of the second cam 206 is translated to the valve 302. In the four-stroke mode the engine is operated by the four-stroke method. The application range of the four-stroke method is indicated in FIG. 4 by cross-hatching. The full load lines are also indicated, as a broken line for the two-stroke method and as a solid line for the four-stroke method.

The speed $\eta_{mot,threshold}$ is a predetermined speed threshold of the internal combustion engine, at which the at least one mode-adaptable valve is changed from one operating mode to the other operating mode. In an internal combustion engine which is operated in the four-stroke mode and in which the at least one mode-adaptable valve is actuated by the second cam, the valve train for switching the internal combustion engine is switched to the two-stroke mode if the speed $\eta_{mot}$ of the internal combustion engine falls below a predetermined speed $\eta_{mot,threshold}$ in such a manner that the at least one mode-adaptable valve is actuated by the first cam.

What has been set out above for the internal combustion engine according to the disclosure also applies to the method according to the disclosure. According to the various embodiments of the internal combustion engine according to the disclosure, different method variants may be advantageous, for which purpose reference is also made to the corresponding objective features of the internal combustion engine and the associated explanations.

Figure 5:
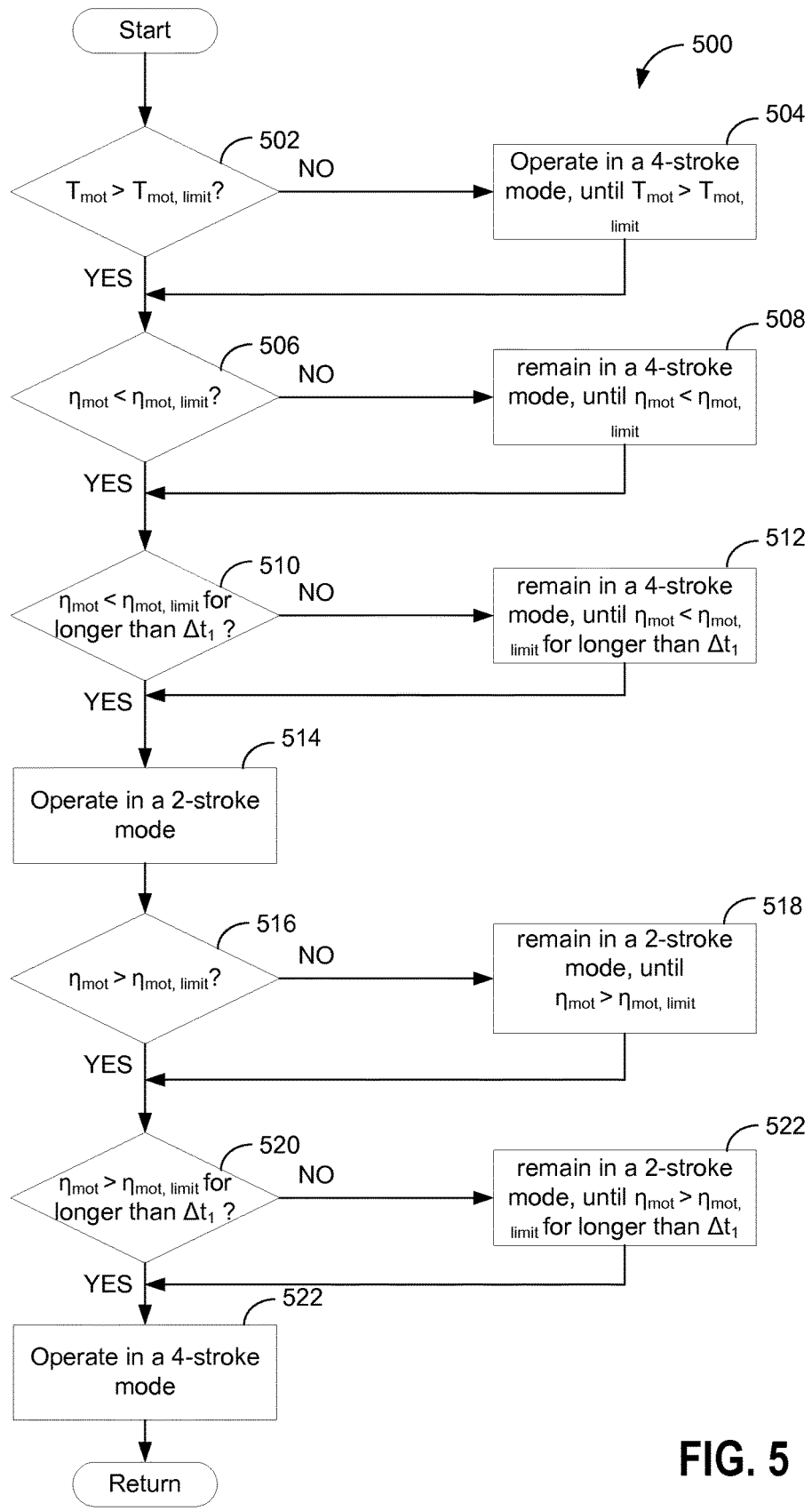
FIG. 5 is a flow chart of a method in accordance with the present disclosure.

Turning now to FIG. 5 a flow chart of a method in accordance with the present disclosure is shown. The method may represent computer code stored in read only memory 106 that can be read by engine controller 12 to control mode-adaptable valves. The method 500 starts with an engine on event and proceeds to 502. At 502 it is determined if the engine load $T_{mot}$ is greater than a predetermined load threshold $T_{mot,\ threshold}$. If at 502, $T_{mot}$ is not greater than $T_{mot,\ threshold}$ (NO) the method proceeds to 504 where the engine is operated in a four-stroke mode.

If at 502, $T_{mot}$ is greater than $T_{mot,\ threshold}$ the method continues to 506. Variants of the method are advantageous in which the internal combustion engine is switched from the four-stroke mode to the two-stroke mode if the load $T_{mot}$ of the internal combustion engine is greater than a predetermined load $T_{mot,threshold}$. The method variant takes into account the condition that the four-stroke method may be better suited for providing relatively small loads than the two-stroke method.

At 506 it is determined if the engine speed $\eta_{mot}$ is less than a predetermined speed threshold $\eta_{mot,\ threshold}$. If the engine speed is not greater than the predetermined speed threshold $\eta_{mot,\ threshold}$ (NO) the method proceeds to 508. At 508, the engine continues to operate in a four-stroke mode. If at 506, the engine speed $\eta_{mot}$ is less than the predetermined speed threshold $\eta_{mot,\ threshold}$ (YES) the method proceeds to 510.

At 510, it is determined if the engine speed $\eta_{mot}$ has been below the predetermined speed threshold $\eta_{mot,\ threshold}$ for longer than a predetermined period of time $\Delta t_1$. If the engine speed $\eta_{mot}$ has not been below the predetermined speed threshold $\eta_{mot}$, threshold for longer than a predetermined period of time $\Delta t_1$ (NO) the method proceeds to 512 where the engine continued to be operated in a four-stroke mode. If the engine speed $\eta_{mot}$ has been below the predetermined speed threshold $\eta_{mot,\ threshold}$ for longer than a predetermined period of time $\Delta t_1$ (YES) the method proceeds to 514 where the engine is switched to a two-stroke mode. In this way, switching between a four-stroke and a two-stroke mode or vice versa may be delayed and excessive and frequent mode switching may be avoided.

Method variants are advantageous in which the valve train for switching the internal combustion engine into the two-stroke mode is switched if the speed $\eta_{mot}$ of the internal combustion engine falls below a predetermined speed $\eta_{mot,threshold}$ and is lower for a predetermined time $\Delta t_1$ than that predetermined speed $\eta_{mot,threshold}$.

The introduction of an additional condition for switching the valve train or switching the internal combustion engine is intended to prevent excessively frequent switching, in particular switching if the speed falls below the predetermined value briefly and then increases again or fluctuates about the predetermined value, without the action of falling below the level justifying or necessitating switching of the valve train.

At 516, it assessed if the engine speed $\eta_{mot}$ is greater than a predetermined speed threshold $\eta_{mot,threshold}$. If the engine speed does not exceed the predetermined speed threshold (NO) the method proceeds to 518 where the engine remains in a two-stroke mode. If the engine speed does exceed the predetermined speed threshold at 520 (YES) the method proceeds to 522. At 522, the engine is operated in a four-stroke mode.

If the speed $\eta_{mot}$ exceeds a predetermined speed $\eta_{mot,threshold}$ again, the valve train for switching the internal combustion engine is switched again in order to switch the internal combustion engine from the two-stroke mode to the four-stroke mode again.

For the reasons already mentioned, method variants are also advantageous in this instance in which switching is carried out if the speed $\eta_{mot}$ exceeds a predetermined speed $\eta_{mot,threshold}$ and the speed $\eta_{mot}$ is higher for a predetermined time $\Delta t_1$ than that predetermined speed $\eta_{mot,threshold}$. The method then returns.

Systems and methods are provided for operating an internal combustion engine in a two-stroke mode or a four-stroke mode to achieve greater fuel efficiency and minimize emissions. The system comprises a mode-adaptable valve; a valve rocker arm to actuate opening and closing of the mode adaptable valve; a cam follower of a first cam for carrying out a two-stroke mode; a cam follower of a second cam for carrying out a four-stroke mode; and a pin to mechanically couple the valve rocker arm to the cam follower of the first cam or the cam follower of the second cam. Coupling the valve rocker arm to the cam follower of the first cam enables a two-stroke mode and coupling the valve rocker arm to the cam follower of the second cam enables a four-stroke mode.

Note that the example control and estimation routines included herein may be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology may be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine, comprising:
   at least one cylinder;
   at least one outlet opening in the at least one cylinder for discharging exhaust gases via an exhaust gas discharge system;
   at least one inlet opening for supplying charging air via an intake system;
   a valve train comprising a valve for each opening and a valve actuation device comprising at least one camshaft having a plurality of cams, wherein,
   at least one mechanical charger is arranged in the intake system;
   at least one camshaft for actuating at least one mode-adaptable valve has two different cams, a first cam to actuate the mode-adaptable valve in a two-stroke mode and a second cam to actuate the mode-adaptable valve in a four-stroke mode; and
   the valve train being switchable such that the actuation of the at least one mode-adaptable valve is carried out in the four-stroke mode by the second cam and in the two-stroke mode by the first cam, wherein the at least one cylinder has at least one additional opening for supplying charging air, and wherein the at least one cylinder has at least one slot which acts as the at least one additional opening and is controlled by a piston oscillating in the at least one cylinder for supplying charging air.

2. The internal combustion engine as claimed in claim 1, wherein the valve actuation device comprises two cam followers associated with the first and second cams and a valve rocker arm suitable to open and close the mode-adaptable valve.

3. The internal combustion engine as claimed in claim 2, wherein the two cam followers are able to be individually, mechanically coupled to the valve rocker arm in order to actuate the mode-adaptable valve in the two-stroke mode when the valve rocker arm is mechanically coupled to the cam follower of the first cam and in the four-stroke mode when the valve rocker arm is mechanically coupled to the cam follower of the second cam.

4. The internal combustion engine as claimed in claim 2, wherein the valve rocker arm is a tilting lever and the two cam followers comprise tilting levers.

5. The internal combustion engine as claimed in claim 1, wherein both the at least one inlet opening and the at least one outlet opening in the at least one cylinder are provided with the mode-adaptable valve.

6. The internal combustion engine as claimed in claim 1, wherein the at least one outlet opening in the at least one cylinder is provided with the mode-adaptable valve.

7. The internal combustion engine as claimed in claim 1, wherein there is provided at least one exhaust gas turbocharger which comprises a turbine arranged in the exhaust gas discharge system and a compressor arranged in the intake system, the compressor being provided upstream of the mechanical charger in the intake system.

8. The internal combustion engine as claimed in claim 7, further comprising an exhaust gas recirculation system which comprises a return line which branches off from the exhaust gas discharge system downstream of the turbine and opens into the intake system upstream of the compressor.

9. The internal combustion engine as claimed in claim 1, further comprising a bypass line for circumventing the mechanical charger, wherein the bypass line branches off from the intake system upstream of the mechanical charger and opens into the intake system again downstream of the mechanical charger, a blocking element being arranged in the bypass line.

10. A method for operating an internal combustion engine comprising:
    when a load is less than a predetermined load threshold, operating the internal combustion engine in a four-stroke mode;
    when an engine speed is greater than a predetermined speed threshold, operating the internal combustion engine in the four-stroke mode;
    when the load is greater than the predetermined load threshold and the engine speed is less than the predetermined speed threshold, operating the engine in a two-stroke mode,
    wherein the two-stroke mode is controlled by a cam follower of a first cam and the four-stroke mode is controlled by a cam follower of a second cam, the two cam followers individually, mechanically connectable to a valve rocker arm for actuating a mode-adaptable valve;
    compressing charging air with a mechanical charger, the mechanical charger located in series with a turbocharger compressor; and
    delaying switching between the two-stroke mode and the four-stroke mode until the engine speed has been greater than or less than the predetermined speed threshold for a time longer than a predetermined time threshold.

11. The method as claimed in claim 10, wherein the mechanical charger is located in a bypass line for circumventing the mechanical charger, and wherein a blocking element is arranged in the bypass line, the blocking element adjusted in a direction of a closure position in a context of switching the internal combustion engine from the four-stroke mode to the two-stroke mode.

12. The method as claimed in claim 10, further comprising compressing charging air with at least one exhaust gas turbocharger, wherein the turbocharger compressor of the at least one exhaust gas turbocharger is configured for relatively large charging air mass flows which occur above the predetermined speed threshold.

13. A system for an engine comprising:
    a mode-adaptable valve;
    a valve rocker arm to actuate opening and closing of the mode-adaptable valve;
    a cam follower of a first cam for carrying out a two-stroke mode;
    a cam follower of a second cam for carrying out a four-stroke mode;
    a pin to mechanically couple the valve rocker arm to the cam follower of the first cam or the cam follower of the second cam; and
    a mechanical charger located in series with a turbocharger compressor, wherein the pin mechanically couples the valve rocker arm to the cam follower of the second cam when an engine speed is greater than a predetermined speed threshold.

14. The system of claim 13, wherein the pin mechanically couples the valve rocker arm to the cam follower of the first cam when an engine load is greater than a predetermined load threshold and an engine speed is less than a predetermined speed threshold.

15. The system of claim 13, wherein the pin mechanically couples the valve rocker arm to the cam follower of the second cam when an engine load is less than a predetermined load threshold.

16. The system of claim 13, wherein the mechanical charger is located in a bypass line, the bypass line comprising a blocking element.

17. A method for operating an internal combustion engine, comprising:
    when a load is less than a predetermined load threshold, operating the internal combustion engine in a four-stroke mode;
    when an engine speed is greater than a predetermined speed threshold, operating the internal combustion engine in the four-stroke mode;
    when the load is greater than the predetermined load threshold and the engine speed is less than the predetermined speed threshold, operating the engine in a two-stroke mode,
    wherein the two-stroke mode is controlled by a cam follower of a first cam and the four-stroke mode is controlled by a cam follower of a second cam, the two cam followers individually, mechanically connectable to a valve rocker arm for actuating a mode-adaptable valve; and
    compressing charging air with a mechanical charger, the mechanical charger located in series with a turbocharger compressor, wherein the mechanical charger is located in a bypass line for circumventing the mechanical charger, and wherein a blocking element is arranged in the bypass line, the blocking element adjusted in a direction of a closure position in a context of switching the internal combustion engine from the four-stroke mode to the two-stroke mode.

* * * * *